(12) United States Patent
Chuah et al.

(10) Patent No.: US 7,894,468 B2
(45) Date of Patent: Feb. 22, 2011

(54) TRANSMISSION METHODS FOR COMMUNICATION SYSTEMS SUPPORTING A MULTICAST MODE

(75) Inventors: Mooi Choo Chuah, Marlboro, NJ (US); Arnab Das, Washington, DC (US); Tingfang Ji, Highland Park, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2416 days.

(21) Appl. No.: 10/391,766

(22) Filed: Mar. 20, 2003

(65) Prior Publication Data

US 2004/0184471 A1 Sep. 23, 2004

(51) Int. Cl.
*H04L 12/403* (2006.01)
*H04L 12/42* (2006.01)

(52) U.S. Cl. ...................... 370/449; 370/346

(58) Field of Classification Search ........... 370/437, 370/389, 328–339, 473, 474, 346, 347, 449, 370/311, 312, 395.4, 431, 395.41, 432, 395.42, 370/433, 444, 447, 464, 465, 468, 477; 714/18, 714/748; 455/450, 502; 375/259
See application file for complete search history.

(56) References Cited

U.S. PATENT DOCUMENTS

| | | | | |
|---|---|---|---|---|
| 5,115,436 A | * | 5/1992 | McAuley | 714/781 |
| 5,761,198 A | * | 6/1998 | Kojima | 370/337 |
| 6,505,253 B1 | * | 1/2003 | Chiu et al. | 709/235 |
| 6,693,907 B1 | * | 2/2004 | Wesley et al. | 370/390 |
| 6,775,279 B2 | * | 8/2004 | Murai et al. | 370/390 |
| 6,959,199 B2 | * | 10/2005 | Ohkubo et al. | 455/522 |
| 6,983,410 B2 | * | 1/2006 | Chen et al. | 714/748 |
| 6,987,738 B2 | * | 1/2006 | Subramanian et al. | 370/252 |
| 6,996,100 B1 | * | 2/2006 | Haartsen | 370/389 |
| 6,999,519 B2 | * | 2/2006 | Davies | 375/259 |
| 7,133,396 B1 | * | 11/2006 | Schmidl et al. | 370/347 |
| 7,224,702 B2 | * | 5/2007 | Lee | 370/473 |

(Continued)

OTHER PUBLICATIONS

Wang et al., "Optimal Adaptive Multireceiver ARQ Protocols", *IEEE Transactions on Communications*, vol. 41, No. 12, Dec. 1, 1993, pp. 1816-1829.

(Continued)

*Primary Examiner*—Ayaz R Sheikh
*Assistant Examiner*—Chuong T Ho
(74) *Attorney, Agent, or Firm*—Harness, Dickey & Pierce, P.L.C.

(57) ABSTRACT

Transmission methods for multicast messages and for signaling message responses thereto in communication systems supporting a multicast mode provide that a number of retransmissions of a multicast message may be changed based on a number of receivers of the message. Signaling messages to the multicast message may be transmitted in response to a fixed number of multicast message transmissions, and receivers that have not received the multicast message after the fixed number of transmissions may request further retransmissions up to an additional given number of times. Further, signaling messages may be transmitted at different times or staggered based on a radio condition of the receivers. For example, a first multicast message may be transmitted, and responses from groups of receivers may be listened to for a given period, after which one of a next multicast message and a portion of the first multicast message may be transmitted to the groups.

7 Claims, 6 Drawing Sheets

U.S. PATENT DOCUMENTS

| | | | |
|---|---|---|---|
| 7,324,545 B2 * | 1/2008 | Chuah et al. | 370/449 |
| 7,620,847 B1 * | 11/2009 | Maxemchuk et al. | 714/18 |
| 2001/0055356 A1 | 12/2001 | Davies | |
| 2002/0080792 A1 * | 6/2002 | Rosier | 370/394 |
| 2003/0050069 A1 * | 3/2003 | Kogiantis et al. | 455/450 |
| 2003/0087653 A1 * | 5/2003 | Leung et al. | 455/502 |
| 2003/0097623 A1 * | 5/2003 | Razavilar et al. | 714/704 |
| 2003/0123470 A1 * | 7/2003 | Kim et al. | 370/437 |
| 2003/0135784 A1 * | 7/2003 | Yamaguchi et al. | 714/18 |
| 2004/0228301 A1 * | 11/2004 | Rudolf et al. | 370/329 |

OTHER PUBLICATIONS

Wang et al., Optimal Adaptive ARQ Protocols for Point-to-Multipoint Communication, *Networks: Evolution or Revolution? IEEE*—Proceedings of the Annual Joint Conference of the Computer and Communication Societies, Mar. 1998, pp. 704-713.

Mithal et al., "A Selective Repeat ARQ Protocol for a Point to Multipoint Channel", *Proceedings of the Conference on Computer Communications (INFOCOM)*, vol. Conf. 6, Mar. 1, 1987, pp. 521-526.

Tanaka, A Performance of Selective-Repeat ARQ with Cyclical Multicopy Transmission, *IEICE Transactions of Fundamentals of Electronics, Communications and Computer Sciences, Institute of Electronics Information and Comm. Eng.*, vol. E79-A, No. 9, Sep. 1, 1996, pp. 1386-1391.

European Search Report.

Aghadavoodi Jolfaei M et al., "Improved selective repeat ARQ schemes for data communication", Vehicular Technology Conference, Jun. 8, 1994, pp. 1407-1411.

Villela D.A.M. et al., "Improving Scability on Reliable Multicast Communications", Elsevier Science Publishers BV, vol. 24, No. 5/6; Mar. 15, 2001, pp. 548-562.

Annamalai A. et al., "Analysis and Optimization of Adaptive Multicopy Transmission ARQ Protocols for Time-Varying Channels", IEEE Inc., vol. 46, No. 10, Oct. 1, 1998, pp. 1356-1368.

Donahoo M.J. et al., "Scalable Multicast Representative Member Selection", Conference on Computer Communications, vol. 1 of 3, conf. 20, Apr. 22, 2001, pp. 259-268.

Grossglauser, M Ed, "Optimal Deterministic Timeouts for Reliable Scalable Multicast", IEEE Conference, voo. 2, conf. 51, Mar. 24, 1996, pp. 1425-1432.

Sakakibara K et al., "A Multicast Hybrid ARQ Scheme Using MDS Codes and GMD Decoding", IEEE Inc., vol. 43, No. 12, Dec. 1, 1995, pp. 2933-2940.

Sakakibara K et al, "A Multicast Hybrid ARQ Scheme with Stored Error Recovery", Electronics & Communications in Japan, vol. 77, No. 9, Sep. 1, 1994, pp. 73-84.

Nonnenmacher J et al., "Parity-Based Loss Recovery for Reliable Multicast Transmission", IEEE Inc., vol. 6, No. 4, Aug. 1, 1998, pp. 349-361.

\* cited by examiner

TRANSMISSION METHODS FOR COMMUNICATION SYSTEMS SUPPORTING A MULTICAST MODE

BACKGROUND OF THE INVENTION

1. Field of the Invention

The present invention generally relates to transmission methods for communication systems supporting a multicast mode.

2. Description of Related Art

Traditionally, voice communication has been the dominant application in a wireless networks. As a result, cellular standards, such as Global System for Mobile Communication (GSM) and IS-95 were optimized for voice traffic only. With the recent explosive growth of the Internet, however, a need has arisen to offer reliable voice and high-speed data access over wireless networks. Until recently, standardized $3^{rd}$ Generation (3G) systems such as CDMA2000 and Enhanced General Packet Radio Service (EGPRS) attempted to provide such capability, by evolving the air interface of existing voice-centric, second generation (2G) systems. The service needs of voice and packet data, however, are different.

The support of delay-tolerant data services in these standards has proven to be inadequate, centrally because voice-centric techniques were applied to resource allocation for packet data. The recently standardized CDMA2000 1X EV-DO supports efficient packet data service over a dedicated CDMA2000 1X carrier by using a design philosophy different from that of CDMA2000 and EGPRS, resulting in a substantially superior performance. However, 1X-EV-DO is not backward compatible with existing 1X systems and does not support voice service on the same carrier.

Thus, an expanded effort is underway in the $3^{rd}$ Generation Partnership Project (3GPP) and 3GPP2 for the evolution of 3G systems such as the Universal Mobile Telecommunications System (UMTS) and CDMA2000 1X. These 3G evolutions, reflected in the high-speed downlink packet access (HSDPA) system in UMTS and in the recent 1X EV-DV standards, have begun to address the challenges of supporting the separate and often conflicting needs of voice and high-speed data simultaneously and efficiently on the same carrier, in a manner that may be fully backward compatible.

To meet the rapidly developing needs associated with wireless applications such as wireless internet application, and to support HSDPA, a shared channel called a High-Speed Downlink Shared Channel (HS-DSCH) may be used. The HS-DSCH may be enabled by a number of performance enhancing technologies, such as Fast Scheduling, Adaptive Modulation and Coding (AMC) and Hybrid Automated Repeat Request (HARQ). Fast Scheduling is a channel quality sensitive scheduling technique to maximize sector throughput, e.g., a base station assigns resources to one or more users at a given time based on channel quality. AMC technologies enable a selection of a data rate and a transmission format (i.e., modulation level and channel coding rate) that best "suits" the scheduled user's prevailing channel condition.

Delays and measurement errors may result in degraded performance from AMC. For example, suppose a block of bits or a packet was sent out using QPSK modulation and a code rate of 0.5 and was received erroneously. A retransmission of that packet takes place, in general with a new appropriate choice of modulation and in general, at least a few new "parity" bits from the original set of coded bits. HARQ technologies may thus be used to provide some level of robustness through fast retransmissions at the physical layer, in an attempt to minimize degradation.

HARQ allows combining of the original transmission with the new transmission, rather than to discard the original transmission. This greatly improves the probability of correct decoding of the packet. The word "hybrid" in HARQ indicates that Forward Error Correction (FEC) techniques have been used in addition to ARQ techniques. HARQ combining schemes imply that retransmissions are combined with the original unsuccessful transmissions. Accordingly, HARQ helps to ensure that transmissions resulting in unsuccessful decoding, by themselves, are not wasted.

There are two types of HARQ: type-I and type-II HARQ. In type-I HARQ, the sender retransmits the same packet upon the reception of a negative acknowledgement (NACK). In type-II HARQ, the information message is encoded into a number of distinctive packets. Upon the reception of NACK, an incremental packet is transmitted by the transmitter. The receiver then combines the packet with the previous packet to jointly decode the message. Lucent Technologies Inc.'s Adaptive Asynchronous Incremental Redundancy ($A^2IR$) approach, which is a form of HARQ combining (type-II HARQ), has been adopted in both 1X EV-DV and HSDPA. $A^2IR$ is a flexible approach and allows HARQ combining of copies that use potentially different modulation schemes.

In UMTS, it is envisaged that for some applications, multiple users should be able to receive the same data at the same time. Two services have so far been defined: (1) a cell broadcast service (CBS); and (2) an IP-Multicast service. A CBS allows for low bit-rate data to be transmitted to all subscribers in a set of given cells over a shared broadcast channel. This service offers a message-based service. An IP-Multicast service enables mobile subscribers to receive multicast traffic. This service currently does not allow for multiple subscribers to share radio or core network resources, and as such, does not offer any advantages as far as resource utilization within the Public Land Mobile Network (PLMN) and over the radio access network.

Multicast is a bandwidth-conserving technology in UMTS that reduces traffic by simultaneously delivering a single stream of information to a large number of recipients. When there are N users in a multicast group, the resources consumed in accordance with a multicast scheme should be on the order of 1/N that of a unicast scheme. Upon the reception of a data packet, a receiver generates a acknowledgement (ACK)/negative acknowledgment (NACK) packet that is sent to the transmitter, indicating whether the transmission is successful or not. In multicast services, these ACK/NACK packets may cause severe collisions or severe interference, if the number of receivers in a multicast group is substantial. Thus, in communication systems employing a multicast mode, when error requirements of a message are stringent, ARQ protocols such as type-I and type-II HARQ ($A^2IR$) may need modification in order to reduce transmission errors over communication links.

SUMMARY OF THE INVENTION

Transmission methods for multicast messages and for signaling message responses to received multicast messages are described for a communication system supporting a multicast mode. A number of retransmissions of a multicast message may be changed based on a number of receivers of the message. Signaling messages to the multicast message may be transmitted in response to a fixed number of multicast message transmissions, and receivers that have still not received the multicast message after the fixed number of transmissions may request further retransmissions of the received multicast message up to an additional given number of times.

In accordance with another aspect, signaling messages from receivers may be transmitted at different times or staggered based on a radio condition of the receivers. For example, a first multicast message may be transmitted to the groups, and responses from the groups may be listened to for a given period, after which one of a next multicast message and a portion of the first multicast message may be transmitted to the groups based on the responses.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limitative of the exemplary embodiments of the present invention and wherein.

DETAILED DESCRIPTION OF EXEMPLARY EMBODIMENTS

Figure 1:
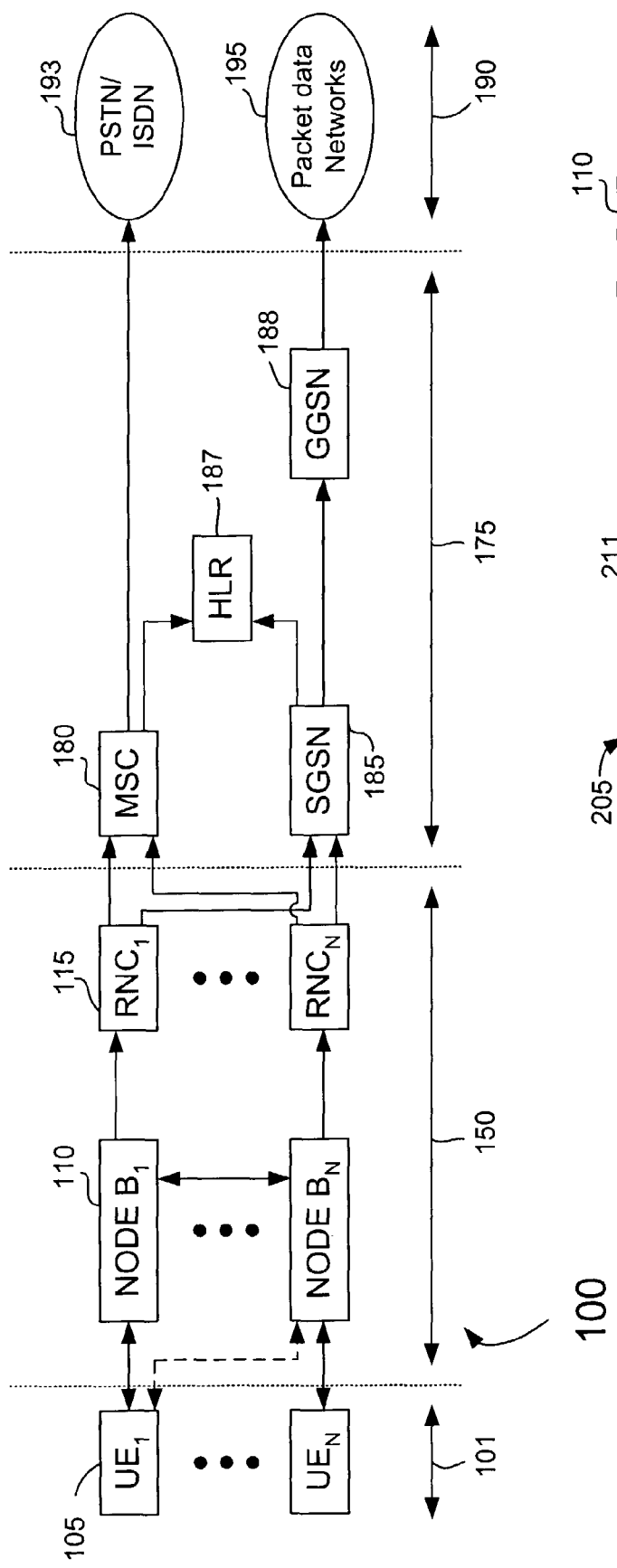
FIG. 1 illustrates a high-level diagram of the UMTS architecture, in accordance with an exemplary embodiment of the invention.

Although the following description is described as based on the well-known (HSDPA) specification in UMTS, and will be described in this exemplary context, it should be noted that the exemplary embodiments shown and described herein are meant to be illustrative only and not limiting in any way. As such, various modifications will be apparent to those skilled in the art for application to other transmission systems such as CDMA2000 for example, and are contemplated by the teachings herein. Where used below, base station and Node-B are synonymous. Additionally where used below, the terms user, user equipment (UE), mobile station and remote station are synonymous and describe a remote user of wireless resources in a wireless communication network. At times a user may also be referred to as a receiver of a multicast message, FIG. 1 illustrates a high-level diagram of the UMTS architecture, in accordance with an exemplary embodiment of the invention. Referring to FIG. 1, UMTS 100 comprises a radio access network part that may be referred to as a UMTS terrestrial radio access network (UTRAN) 150, which may interface to a variety of core networks 175. The core networks 175 may contain mobile switching centers (MSC) 180 and gateways (Service GPRS Support Node (SGSN) 185 and Gateway GPRS serving/support node (GGSN) 188) to external networks 190. In general in UMTS, SGSNs and GGSNs exchange packets with the mobile station over the radio network, and exchange packets with other internet protocol (IP) networks. External networks 190 may include various circuit networks 193 such as a PSTN or ISDN (e.g., Internet) and packet data networks 195. UTRAN 150 may be linked to the core networks 175 via back-haul facilities such as T1/E1, STM-x, etc., for example.

UTRAN 150 may include cell sites, called Node Bs 110, which may serve a group of UEs 105 via radio interface 101. A Node B 110 may contain radio transceivers and radio network controllers (RNCs) 115 in UTRAN 150. Several Node Bs 110 may interface with an RNC 115 where, in additional to call setup and control activity, tasks such as radio resource management and frame selection in soft handoff may be carried out. Node Bs 110 and RNCs 115 may be connected via links that use ATM-based packet transport, for example. For HSDPA, the HS-DSCH may be terminated at the Node B 110 in UTRAN 150.

Figure 2:
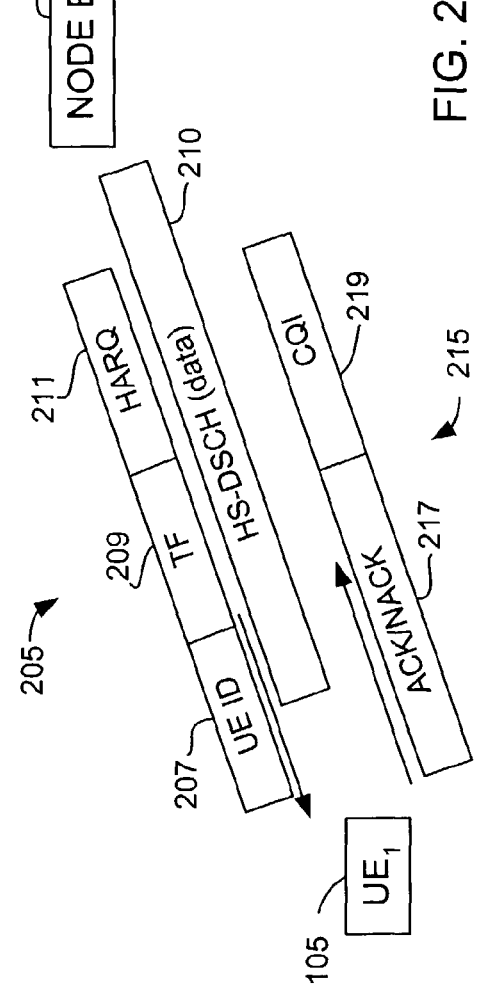
FIG. 2 illustrates HSDPA signaling in UMTS, in accordance with an exemplary embodiment of the invention.

FIG. 2 illustrates HSDPA signaling in UMTS, in accordance with an exemplary embodiment of the invention. In an HSPDA system, downlink signaling may be done through the use of Shared Control Channels (SCCHs) accompanied with each HS-DSCH. Since SCCHs, HS-DSCH, and voice channels share the same resources (e.g., power and bandwidth), control signaling may often be improved, although at a potential cost of system resources and capacity. Referring to FIG. 2, for downlink, the signaling messages sent over SCCH 205 may include AMC and HARQ control information, shown as field 211. In the uplink, signaling messages sent over SCCH 215 may include an acknowledgement (ACK)/acknowledgement (NACK) for HARQ field 217 and a channel quality indication (CQI) field 219 for scheduling an AMC, for example.

Due to the scheduled nature of the HS-DSCH 210, the control signaling may not be needed all the time for a particular user (UE 105). For downlink, where the number of channelization codes may be limited, it may be beneficial to designate only a few control channels to be shared among the users. Thus, SCCH 205 may be assigned to a user only when the user is scheduled.

In order to provide the user with the AMC and HARQ control information in time, the SCCH 205 may be staggered with the HS-DSCH 210, as shown in FIG. 2. The SCCH may be sent ahead of the HS-DSCH. Though successful decoding of the user equipment identification (UE ID) field 207, the intended user may be informed of the upcoming HS-DSCH 210. UE 105 then decodes the rest of the SCCH 205 to obtain the AMC and HARQ control information (e.g., the modulation and coding scheme (MCS) and HARQ channel used) and prepares for the decoding of the HS-DSCH 210.

Figure 3:
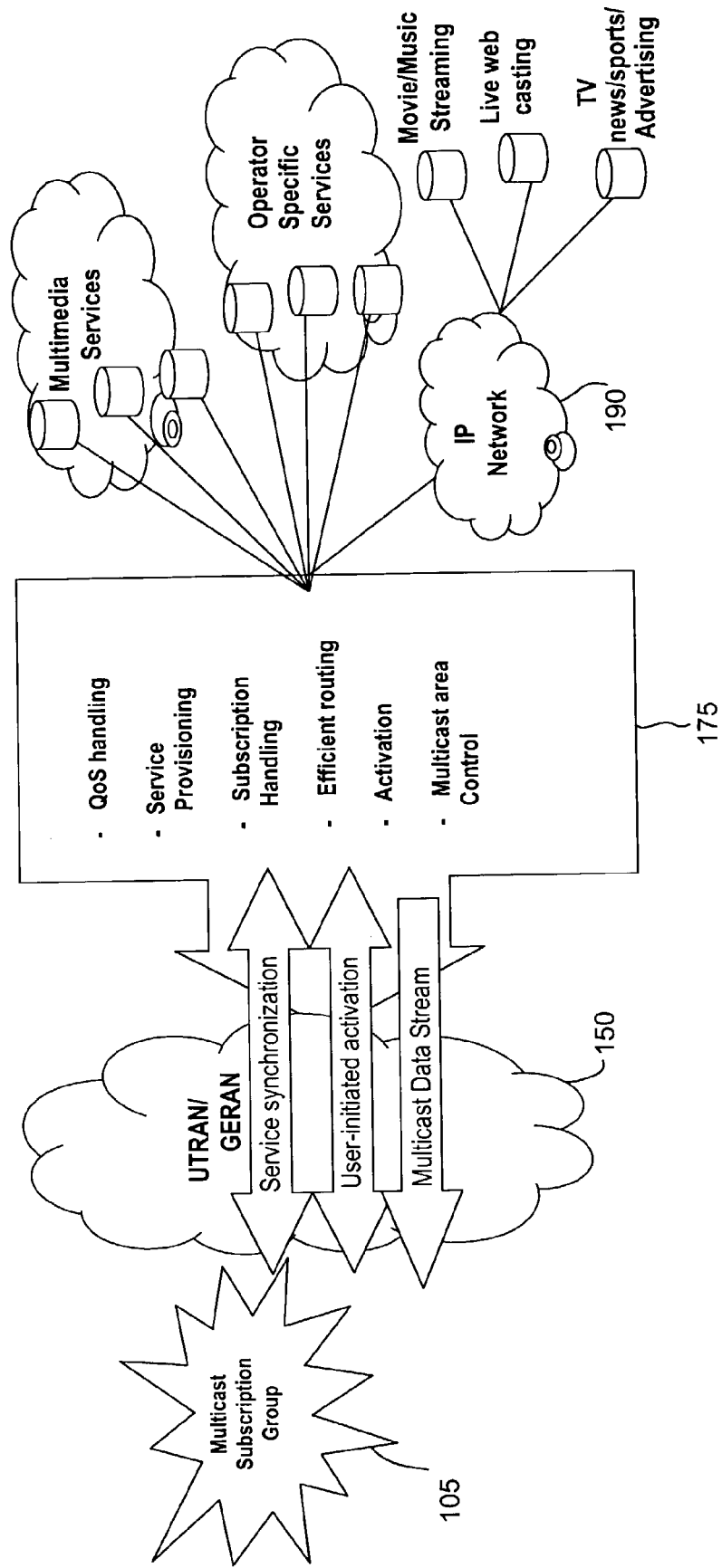
FIG. 3 illustrates a multicast mode in UMTS in accordance with an exemplary embodiment of the invention.

FIG. 3 illustrates a network configuration in a multicast mode of operation, in accordance with an exemplary embodiment of the present invention. Point to multipoint services exist today which allow data from a single source entity to be transmitted to multiple endpoints. These services are expected to be used extensively over wireless networks, hence there is a need for a capability in the PLMN to efficiently support them. The Multimedia Broadcast/Multicast Service (MBMS) may provide this capability for such broadcast/multicast services provided by the home environment and other value added service providers (VASPs). The MBMS is an unidirectional point to multipoint bearer service in which data is transmitted from a single source entity to multiple recipients. One of the operational modes defined by 3GPP is the multicast mode.

FIG. 3 shows a general high level overview of a multicast mode network. As briefly discussed above, the multicast mode may allow unidirectional point-to-multipoint transmission of multimedia data (e.g. text, audio, picture, video, etc.) from a single source point to a multicast group in a multicast area. The multicast mode is intended to efficiently use radio/ network resources e.g. data is transmitted over a common radio channel. Data may be transmitted to multicast areas as defined by the network (e.g., home environment). In the multicast mode, the network may selectively transmit to cells within the multicast area which contain members of a multicast group. A multicast service received by the UE may involve one or more successive multicast sessions. For example, a multicast service might consist of a single ongoing session (e.g. a multimedia stream) or may involve several intermittent multicast sessions over an extended period of time (e.g. messages). Applications that may take advantage of multicast, and hence, of the exemplary embodiments of the present invention, may include videoconferencing, corporate communications, distance learning, online bidding, online gaming and distribution of software, stock quotes, and news, etc.

The multicast mode generally requires a subscription to the multicast subscription group and then the user joining the corresponding multicast group. The subscription and group joining may be made by the PLMN operator, the user or a third party on their behalf (e.g. company). The multicast mode should be inter-operable with IETF IP Multicast. This could allow an optimal use of IP service platforms to help maximize the availability of applications and content so that current and future services can be delivered in a more resource efficient manner.

Figure 4:
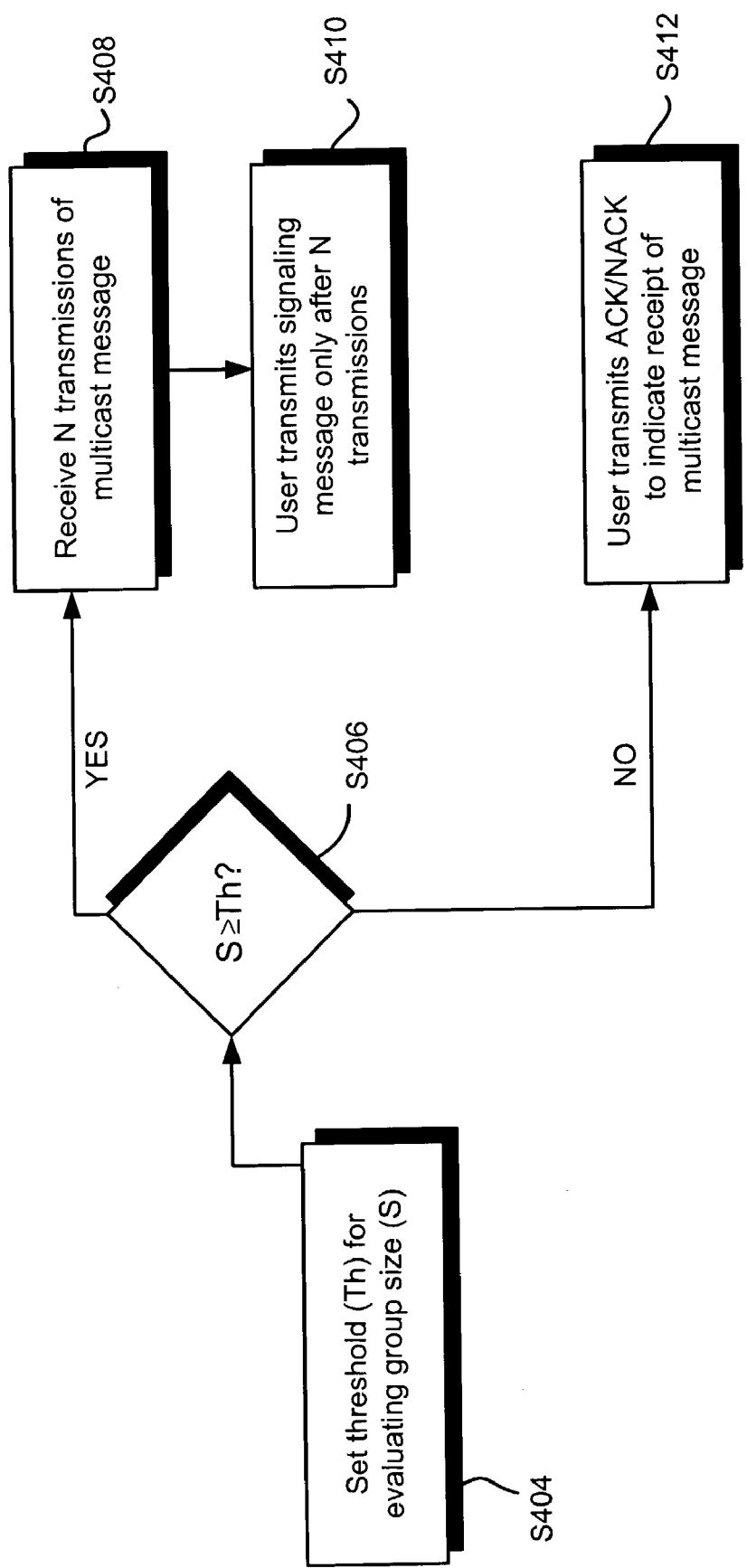
FIG. 4 is a flowchart describing a method in accordance with an exemplary embodiment of the invention.

FIG. 4 is a flowchart describing a method in accordance with an exemplary embodiment of the invention. A number of transmissions of a multicast message to a group of receivers (users) may be changed based on group size of the receivers. In order to prevent a buffer at the sender (transmitter) of the multicast message from overflowing, a departure rate of data packets (which comprise the multicast message) should be higher than the arrival rate of packets received from the users. Thus, based on a offered load, a packet size and a number of transmissions (N) may be determined.

In an effort to increase the efficiency of transmission of the multicast message, it may be desirable to use a small N, or a small group size. A small group size (or good radio conditions) may require a fewer number of retransmissions of the multicast message from the sender, as compared to a larger group size, or as compared to a group having poor radio conditions.

Accordingly, and referring now to FIG. 4, a threshold (Th) may be set (S404) for evaluation against the group size (S) of the users. The threshold may be set by internal software in a base station transceiver, for example, that keeps track of those receivers that are registered with the base station, and could be fixed or variable. A given group size of users may be evaluated against the threshold (S406) in order to determine whether or not HARQ or $A^2IR$ may be implemented for retransmitting the multicast message to the group, for example. If S equals or is greater than Th ($S \geq Th$, the output of S406 is "YES"), the group of users receive N transmissions of the multicast message. In other words, a fixed number of transmissions of the multicast message are sent (S408). Accordingly, users in the group may transmit a signaling message (S410), which may be embodied as an acknowledgement (ACK) or negative acknowledgement (NACK) packet, for example, in response to the received multicast message. In any event, the multicast message will be retransmitted N times (N encompassing the original transmission of the multicast message and retransmissions) to the group.

However, if the group size (S) is less than the threshold (S<Th, the output of S406 is "NO"), then the users of the group may transmit an ACK/NACK packet to indicate receipt of the multicast message without being constrained by a fixed number of transmissions, as in the unicast mode, for example. Accordingly, the above approach may effectively reduce the amount of feedback signaling required on the uplink, thereby conserving resources.

Figure 5:
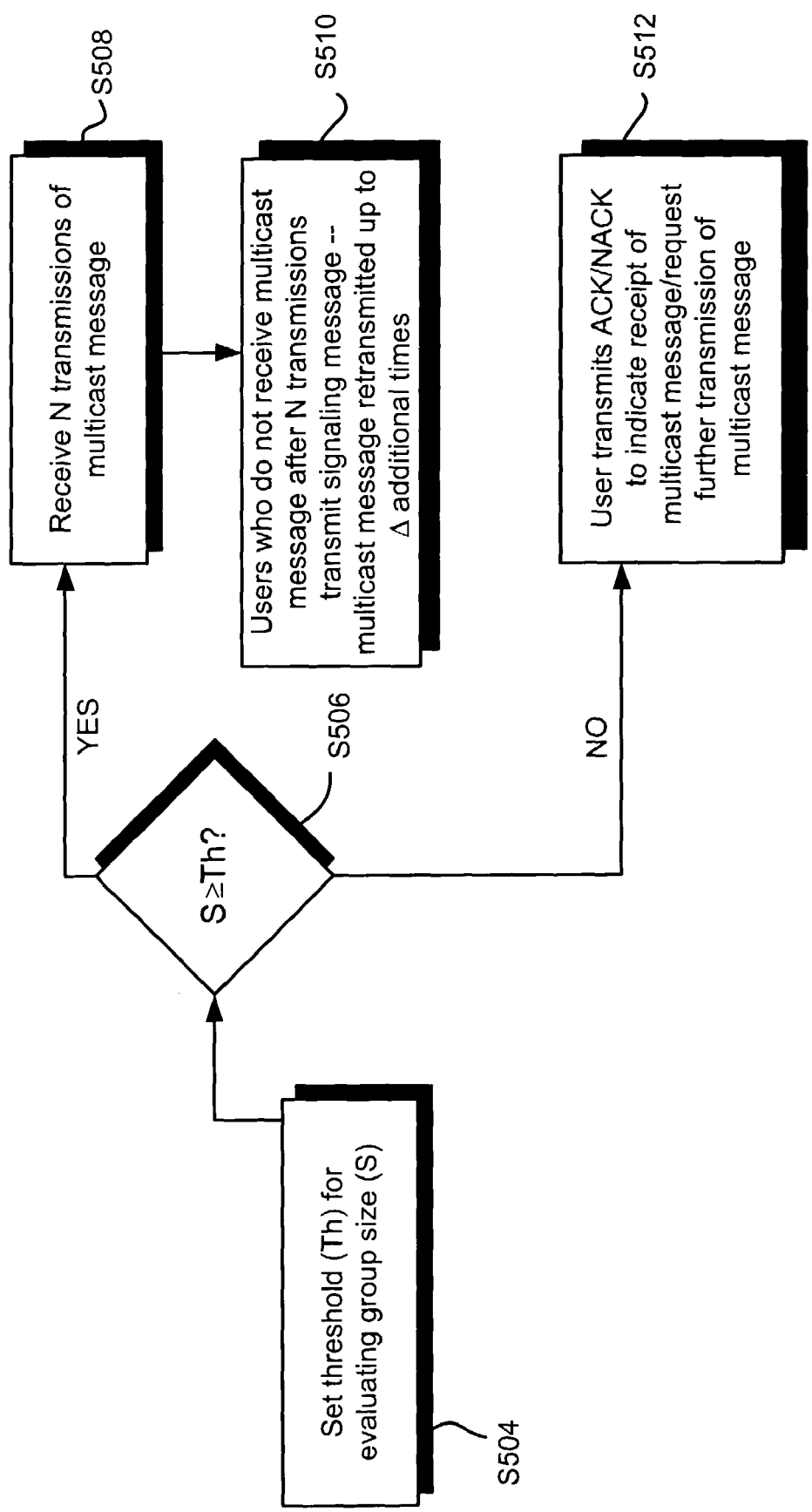
FIG. 5 is a flowchart describing a method in accordance with another exemplary embodiment of the invention.

FIG. 5 is a flowchart describing a method in accordance with another exemplary embodiment of the invention. Many of the functions in FIG. 5 are similar to FIG. 4; therefore, only the differences are discussed in detail. Similar to FIG. 4, the group size of the users (S) may be evaluated against a threshold (S506). If $S \geq Th$, the group of users receives a fixed number of N transmissions of the multicast message (S508). After the Nth transmission, any user in the group who has not yet received the multicast message may transmit a signaling message (S510) at that time. Accordingly, the sender of the multicast message will retransmit the multicast message up to Δ additional times. If, on the other hand, the group size is small, i.e., $S \leq Th$ (output of S506 is "NO"), users of the group may transmit an ACK/NACK packet to indicate receipt of the multicast message and/or to request a further transmission of the multicast message (S512), as may be done in the unicast mode. Accordingly, since HARQ and/or $A^2IR$, for example, may allow retransmission of the multicast message up to Δ times, such may further effectively reduce the amount of feedback required on the uplink, in communication systems supporting a multicast mode.

Figure 6A:
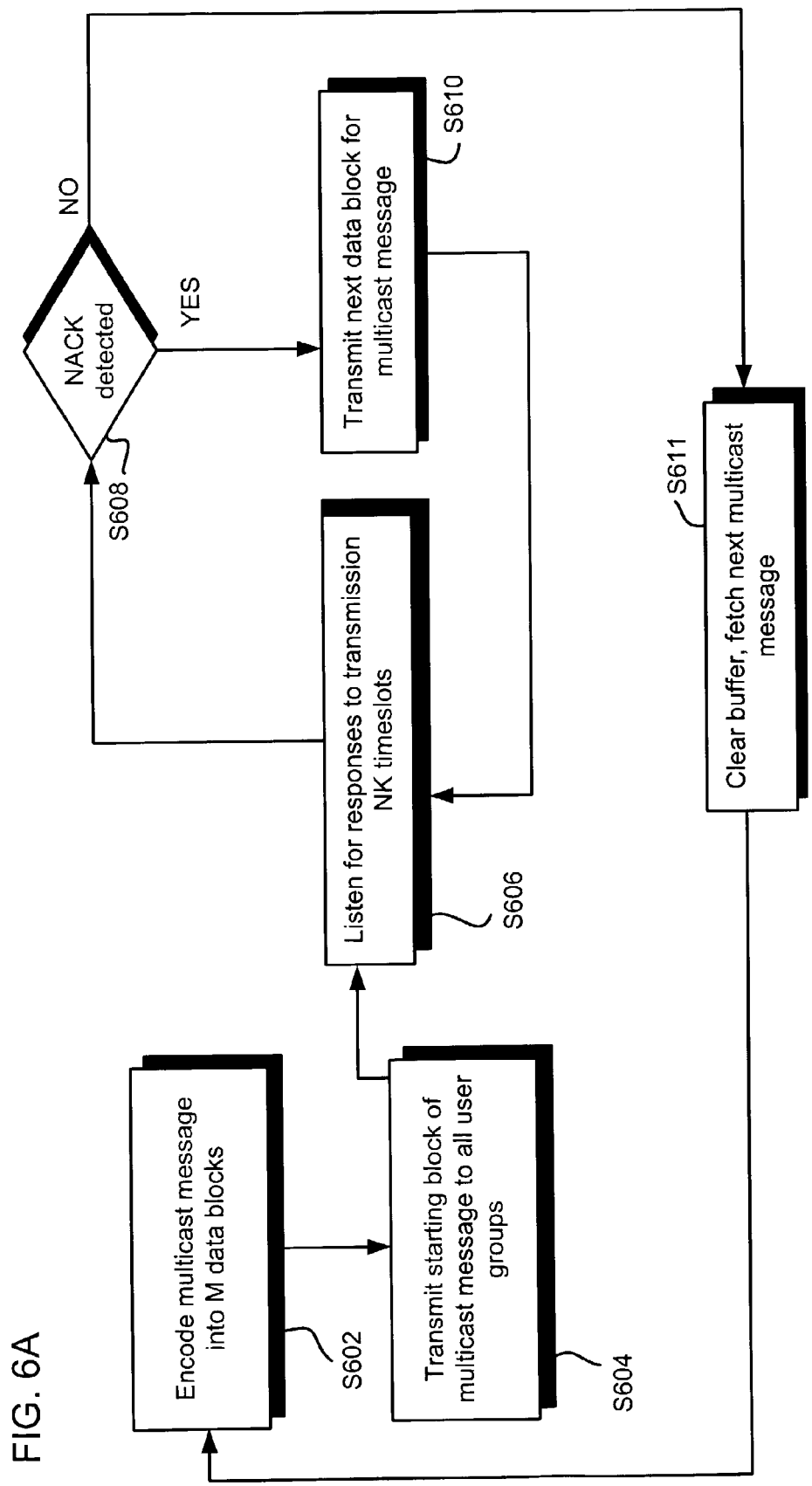
FIGS. 6(*a*) and 6(*b*) are flowcharts describing a method in accordance with another exemplary embodiment of the invention.
Figure 6B:
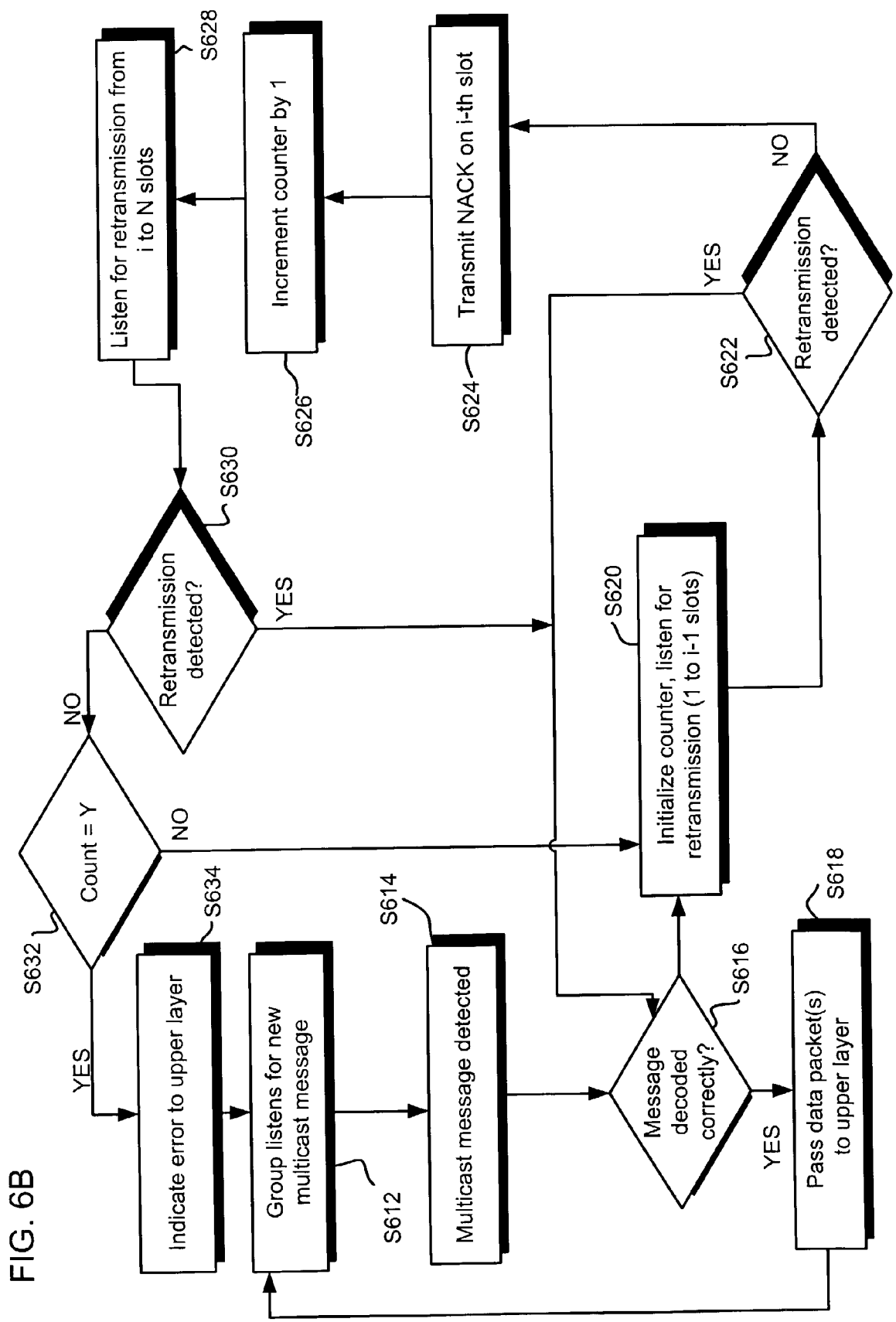

FIGS. 6(a) and 6(b) are flowcharts describing a method in accordance with another exemplary embodiment of the invention. In this exemplary embodiment, an offset feedback procedure may be utilized. For example, and given a lenient delay constraint at the sender or source of the multicast message, signaling messages from the receivers (users) of the signaling message may be staggered. Compared with a single transmission, multiple transmissions at different time instances over a given period of time may be helpful for error correcting over wireless channels such as a high speed downlink shared channel (HS-DSCH). The users may be ordered into N groups based on a radio condition of the group. In particular, the order of signaling message transmission for the N ordered group may be determined based on a group with the worst radio condition transmitting their signaling messages first, in reverse order of radio condition (i.e., the group with the best radio conditions transmit later).

FIG. 6(a) is a flow diagram describing a transmission offset technique from the viewpoint of a sender of a multicast message in accordance with an exemplary embodiment of the invention. Initially, a sender (transmitter), such as a base station transceiver, for example, may encode (S602) a multicast message into M data blocks. The first block may be independently decodable, and subsequent blocks may be a repetition of the first block, e.g., incremental redundancy data blocks. The transmitter may then transmit (S604) the starting block of the multicast message over a downlink channel to all groups of users, e.g., each i-th group.

After transmission begins, the transmitter listens (S606) for responses in N*K responding timeslots from each i-th group of users (each i-th group responds in order of their radio condition). The parameter K is a configurable delay constraint parameter that may be utilized to control maximum delay between multicast message transmissions. The parameter N represents the number of groups of users, and N*K (NK) may represent the maximum delay (in terms of timeslots) that the transmitter needs to wait before moving on to the next multicast message. If the transmitter hears a NACK (output of S608 is YES) in one of the NK timeslots, transmit (S610) the next block for the same message and repeat function S606. If the transmitter does not hear a NACK in any of the NK timeslots slots (output of S608 is NO), the transmitter clears its buffer and fetches the next multicast message (S611), and repeats function S602.

FIG. 6(b) is a flow diagram describing the transmission offset technique of FIG. 6(a) from the viewpoint of a receiver of a multicast message in accordance with an exemplary embodiment of the invention. Referring to FIG. 6(b), each receiver (user) in an i-th group waits, or listens (S612) for a new transmission of a multicast message. When a new transmission is detected (S614), each user may attempt to decode the multicast message (S614). If the multicast message is decoded correctly (output of S616 is YES), the user passes (S618) the data packet(s) to the to upper layer and listens (back to S612) for the start of a next multicast message. If the decoding has errors (output of S616 is NO), the user(s) with errors each may initialize a retransmission counter to zero (counter counts from 0 to K) and listen (S620) for a possible retransmission of the multicast message (from 1 to i-1 slots). The exact, or same, NACK transmission may be iteratively repeated (retransmitted as part of the signaling message), by one or more users of the group up to Y times.

If the retransmission of the multicast message is detected (output of S622 is YES) the user attempts to decode and if correct (output of S616 is YES), the user passes (S618) the data packet(s) to the to upper layer and listens (back to function S612) for the start of a next multicast message. If no retransmission starts after i-1 slots (output of S622 is NO), the user transmits (S624) a NACK in the i-th slot and increments (S626) the retransmission counter by 1, and then listens (S628) for retransmission from i to N slots. If retransmission is detected (output of S630 is YES), then the user attempts to decode and if correct (output of S616 is YES), the user passes (S618) the data packet(s) to the to upper layer and listens (at S612) for the start of a next multicast message. If no retransmission is detected in the next N-i slots (output of S630 is NO), the counts are evaluated (S632). If count<Y (output of 632 is NO), then the user returns to listening (S622). If count=Y (output of 632 is YES), this means that one or more users in the group transmitted Y NACKs, but never received the retransmission of the multicast message. Accordingly, those users indicate error (S634) to the upper layer and proceed to function S612 and following functions.

A benefit of employing a multicast mode in network 175 is that the data may be sent once on each link. For example, SGSN 188 will send data once to an RNC 115, regardless of the number of Node Bs 110 and UEs 105 that wish to receive the data. The benefit of using multicast on the air interface is that many users can receive the same data on a common channel, so as not to clog up the air interface with multiple transmissions of the same data. With increasing use of high bandwidth applications in third generation mobile communication systems, especially with a substantial number of users receiving the same high data rate services, efficient information distribution is essential. Multicasting may decrease the amount of data within the network and use resources more efficiently.

Further, the exemplary embodiments of the present invention may reduce the amount of signaling required in the uplink, potentially reducing the amount of ACK/NACK packet traffic. This may reduce the severity and frequency of ACK/NACK packet collisions and interference on the air interface, possibly conserving resources and improving the efficiency of communication systems that support multicast.

The exemplary embodiments of the invention being thus described, it will be obvious that the same may be varied in many ways. Such variations are not to be regarded as departure from the spirit and scope of the exemplary embodiments of the invention, and all such modifications as would be obvious to one skilled in the art are intended to be included within the scope of the following claims.

What is claimed is:

1. An automated repeat request (ARQ) transmission method of receiving a number of retransmissions of a multicast message that is based on a number of receivers of the multicast message comprising:
   receiving, in a network element, a plurality of retransmissions for an ARQ transmission of the multicast message based on a group size (S) of a group of the receivers if the group size equals or exceeds a threshold; and
   transmitting at least one of an acknowledgement (ACK) and a negative acknowledgement (NACK) to request further transmissions of the multicast message only after receiving the plurality of retransmissions if said group size (S) equals or exceeds a threshold (Th);
   transmitting one of an acknowledgment (ACK) and a negative acknowledgement (NACK) on an uplink channel to request further transmissions of the multicast message if the group size is smaller than the threshold.

2. The method of claim 1, wherein the uplink channel is a shared control channel (SCCH), and the group of receivers are part of a multicast subscription group.

3. An automated repeat request ARQ transmission method for a communication system supporting a multicast mode for one or more users, comprising:
   ordering, in a first network element, said users into N groups for receiving an ARQ transmission of a multicast message, said N users being ordered according to a radio condition of each user; and
   staggering, in a second network element, transmission of signaling messages based on the order of the N groups, wherein the ordering further includes:
      ordering said N groups based on a worst radio condition, the earliest group to transmit being a group having the worst radio condition.

4. The method of claim 3, wherein said staggering transmission further includes users in each group transmitting one of an acknowledgment (ACK) and a negative acknowledgement (NACK), at a particular group's turn to transmit.

5. The method of claim 3, wherein said staggering transmission further includes users in each group transmitting only a negative acknowledgment (NACK) in order to request retransmissions of the received multicast message, at a particular group's turn to transmit.

6. The method of claim 5, wherein said transmitting further includes repetitively transmitting the same NACK up to K times, until no NACK is detected by a sender in any of NK timeslots.

7. The method of claim 3, wherein the first and second network elements are the same element.

* * * * *